(12) United States Patent
Advani et al.

(10) Patent No.: US 7,517,481 B2
(45) Date of Patent: Apr. 14, 2009

(54) MOLDING SYSTEMS AND PROCESSES

(75) Inventors: Suresh G. Advani, Newark, DE (US);
Mathieu Devillard, Newark, DE (US);
Jeffrey Lawrence, Newark, DE (US)

(73) Assignee: University of Delaware, Newark, DE (US)

( * ) Notice: Subject to any disclaimer, the term of this patent is extended or adjusted under 35 U.S.C. 154(b) by 244 days.

(21) Appl. No.: 10/544,503

(22) PCT Filed: Feb. 4, 2004

(86) PCT No.: PCT/US2004/002939

§ 371 (c)(1),
(2), (4) Date: Jun. 28, 2006

(87) PCT Pub. No.: WO2005/021232

PCT Pub. Date: Mar. 10, 2005

(65) Prior Publication Data

US 2006/0255500 A1    Nov. 16, 2006

Related U.S. Application Data

(60) Provisional application No. 60/444,944, filed on Feb. 5, 2003.

(51) Int. Cl.
*B29C 45/23* (2006.01)

(52) U.S. Cl. .................. 264/40.5; 264/510; 425/562; 425/570

(58) Field of Classification Search ............ 425/85, 425/110, 116, 120, 542, 546, 562, 570; 264/40.5, 264/510
See application file for complete search history.

(56) References Cited

U.S. PATENT DOCUMENTS

| 3,339,239 A | 9/1967 | Peck |
| 5,443,778 A | 8/1995 | Schlingman |
| 6,298,896 B1 | 10/2001 | Sherrill et al. |
| 6,555,045 B2 | 4/2003 | McClure et al. |

FOREIGN PATENT DOCUMENTS

EP    45555    2/1982

OTHER PUBLICATIONS

International Search Report No. PCT/US2004/0239, dated Dec. 29, 2004, 1 page.

*Primary Examiner*—Tim Heitbrink
(74) *Attorney, Agent, or Firm*—RatnerPrestia

(57) ABSTRACT

A mold system (1000) includes a gate control system (150) that selectively deforms a deformable member (140) to selectively close one or more injection gates (127, 227) and/or vent gates (128, 228) in a mold platen (160, 260). The injection gates (127, 227) are selectively opened and closed by engaging the deformable member (140) with the injection gates (127, 227). The deformable member (140) is located between the gate control system (150) and the curing fluid, and curing fluid entering the mold platen (160, 260) therefore does not contact the gate control system (150).

15 Claims, 5 Drawing Sheets

MOLDING SYSTEMS AND PROCESSES

GOVERNMENT INTEREST

The U.S. Government has a paid-up license in this invention and the right in limited circumstances to require the patent owner to license others on reasonable terms as provided for by the terms of N00014-00-C-0333 awarded by ONR.

BACKGROUND

1. Technical Field

The technical field is molding systems. More specifically, the technical field relates to molding processes in which curing fluid is delivered to multiple parts of a molding platen during injection.

2. Related Art

Traditional resin-delivering systems used in resin transfer molding (RTM) and vacuum-assisted resin transfer molding (VARTM) use plastic tubing connected to a mold at vent and resin gate locations. The resin gates allow resin to be injected into a mold cavity. In such processes it is often desirable to deliver resin to multiple locations of the mold cavity with specific timing. If multiple gates and vents are required for flow control purposes, a large network of tubing is required. After the molding process is complete, the tubing contains cured resin, and cannot be reused in a subsequent process. The repeated replacement of tubing adds cost to the molding operation, increases the complexity of the operation, and increases the time required for each molding operation.

Therefore, a need exists for a molding process that avoids the large amount of material waste and that does not require excessive time, and a system for carrying out such a molding process.

SUMMARY

According to a first embodiment, a mold system comprises a source of curing fluid, a mold platen, a gate control system, and a mold cavity enclosure enclosing at least a part of a mold cavity. The mold platen comprises a network plate comprising a plurality of injection gates and a deformable member disposed near the network plate. The injection gates are in fluid communication with the mold cavity and the source of curing fluid. The gate control system selectively deforms the deformable member to selectively close one or more injection gates.

According to the first embodiment, the injection gates are selectively opened and closed by engaging the deformable member with the injection gates. Curing fluid entering the mold platen does not contact the gate control system, and tubing is not required to deliver curing fluid to specific injection gates. Time, material, and costs are therefore saved in the molding operations.

Other embodiments and advantages of the present invention are discussed below.

BRIEF DESCRIPTION OF THE DRAWINGS

The detailed description will refer to the following drawings, wherein like numerals refer to like elements, and wherein.

DETAILED DESCRIPTION

Figure 1:
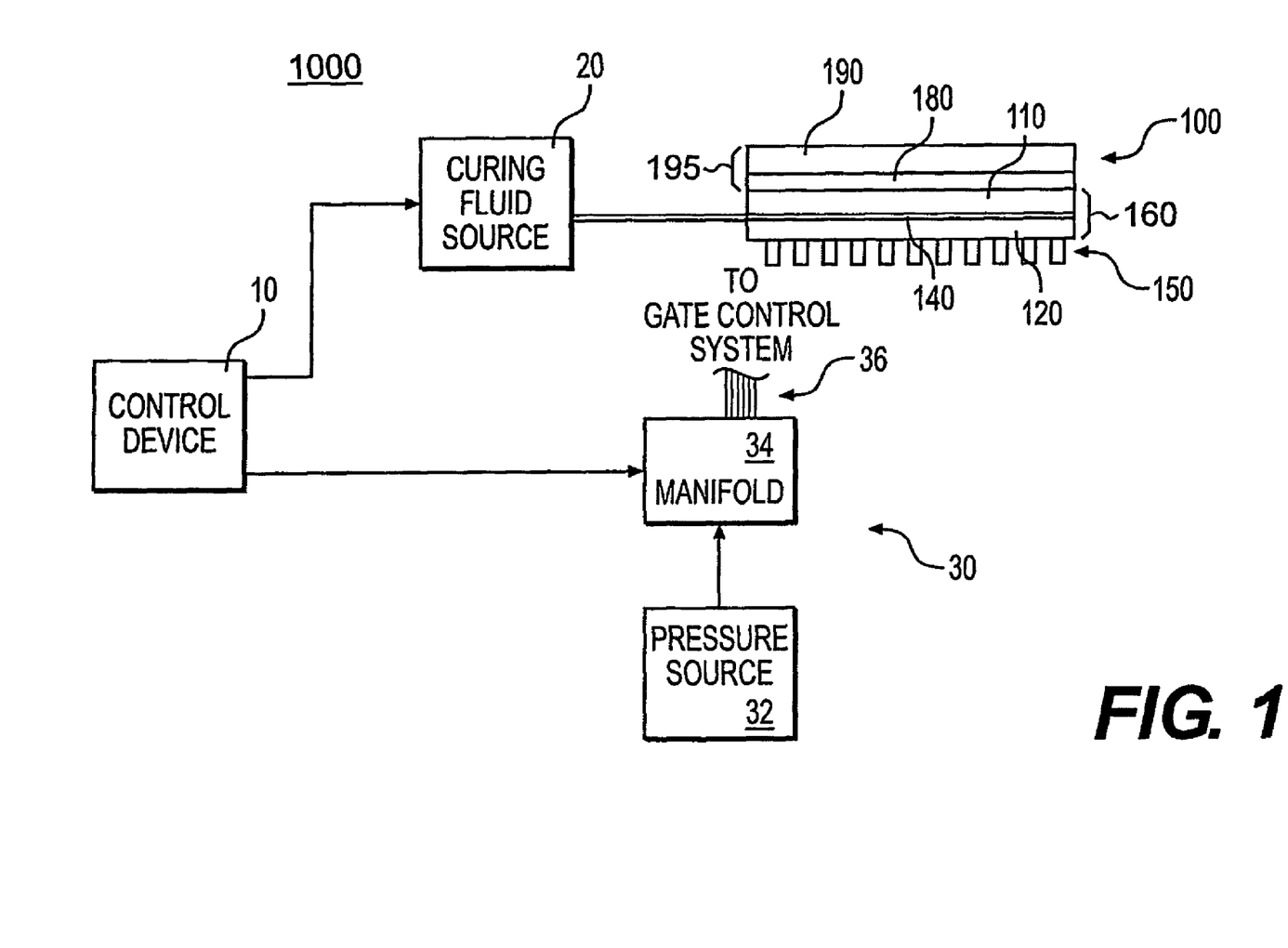
FIG. 1 is a schematic view of a mold system according to an embodiment of the present invention.

FIG. 1 is a schematic view of a mold system 1000. The mold system 1000 includes a control device 10, a source 20 of curing fluid, an actuating system 30, and a mold structure 100.

The control device 10 may control the flow of curing fluid from the curing fluid source 20, and may also control the actuating functions of the actuating system 30. The curing fluid source 20 supplies curing fluid to the mold structure 100, the curing fluid being used to form molded products in the system 1000. The elements of the mold structure 100 are illustrated schematically in FIG. 1. The mold structure 100 includes a first, backer plate 110, and a second, network plate 120. The backer plate 110 and the network plate 120 are separated by a deformable member 140. The backer plate 110 may includes mounting structures to house a gate control system 150 that acts upon the deformable member 140 to selectively control the flow of curing fluid in the mold structure 100. The backer plate 110, the network plate 120 and the deformable member 140 comprise a mold platen 160.

The mold structure 100 also includes a frame 180 and a lid 190. The frame 180 and the lid 190 form a mold enclosure 195, and define a mold cavity (not shown in FIG. 1) where the curing fluid is directed and ultimately cured to form the mold product.

The actuating system 30 includes a pressure source 32, a manifold 34, and pressure lines 36. The pressure lines 36 are connected at one end to the manifold 34, and at their other ends to individual elements of the gate control system 150. The pressure source 32 provides compressed fluid, such as air, to the manifold 34. The manifold 34, under instructions from the control device 10, may selectively provide pressurized fluid to the gate control system 150 to activate individual elements in the gate control system 150. The structure and function of the gate control system 150 is discussed in further detail below with reference to FIGS. 3-5A and 5B.

Figure 2A:
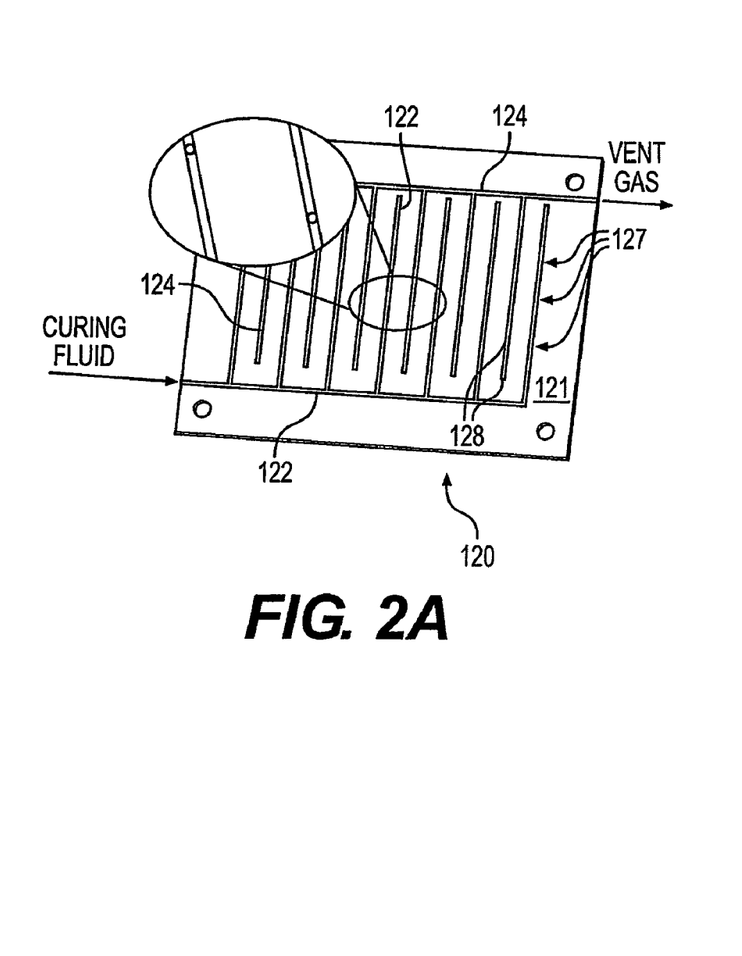
FIG. 2A is a perspective view of a front side of a network plate used in the mold system illustrated in FIG. 1.
Figure 2B:
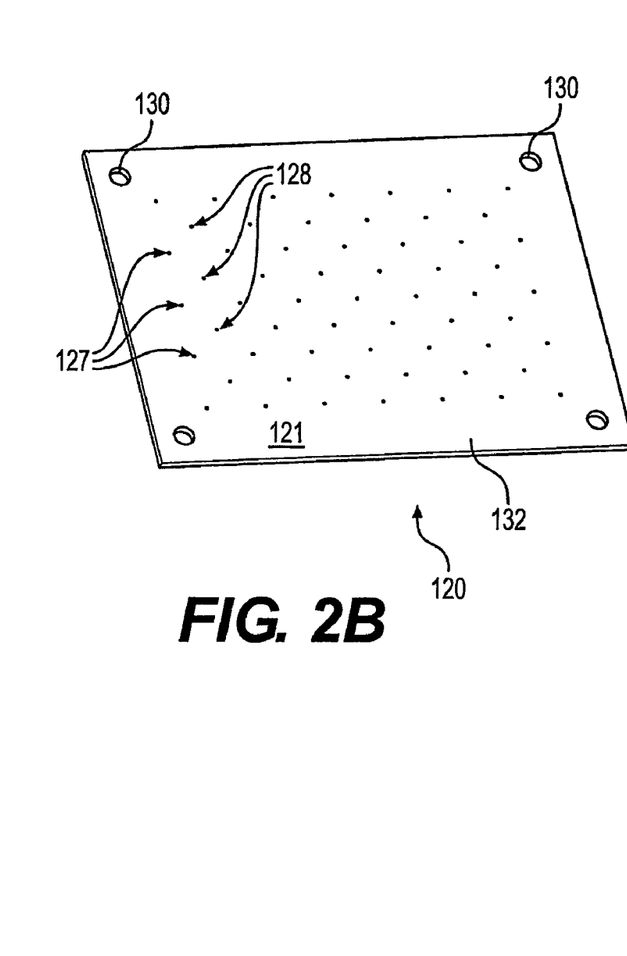
FIG. 2B is a perspective view of the back side of the network plate shown in FIG. 2A.

FIG. 2A is a perspective view of a front side of the network plate 120 used in the mold system 1000 illustrated in FIG. 1. FIG. 2B is a perspective view of the back side of the network plate 120.

Referring to FIG. 2A, the network plate 120 comprises a substantially flat plate 121. A first set of fluid delivery channels 122 are formed in the plate 121. The fluid delivery channels 122 are arranged in an interlocking or interdigitated pattern with a second set of channels 124 in the plate 121. The fluid delivery channels 122 are used to deliver curing fluid from the curing fluid source 30 to the mold cavity (not shown), via injection gates 127. In this way, curing fluid is delivered from the front side of the network plate 120 into the mold cavity. The mold cavity is adjacent the back side, or molding surface 132, of the network plate 120 (see FIG. 2B). Bolt holes 130 may be formed in the network plate 120 for securing the plate to other components of the system 1000.

The second set of channels 124 are used to vent gas from the mold cavity during molding operations. Vent gases are conveyed from the mold cavity, through vent gates 128, and out of the mold structure 100 via the channels 124. Curing fluid may also escape through the vent gates 128.

Figure 3:
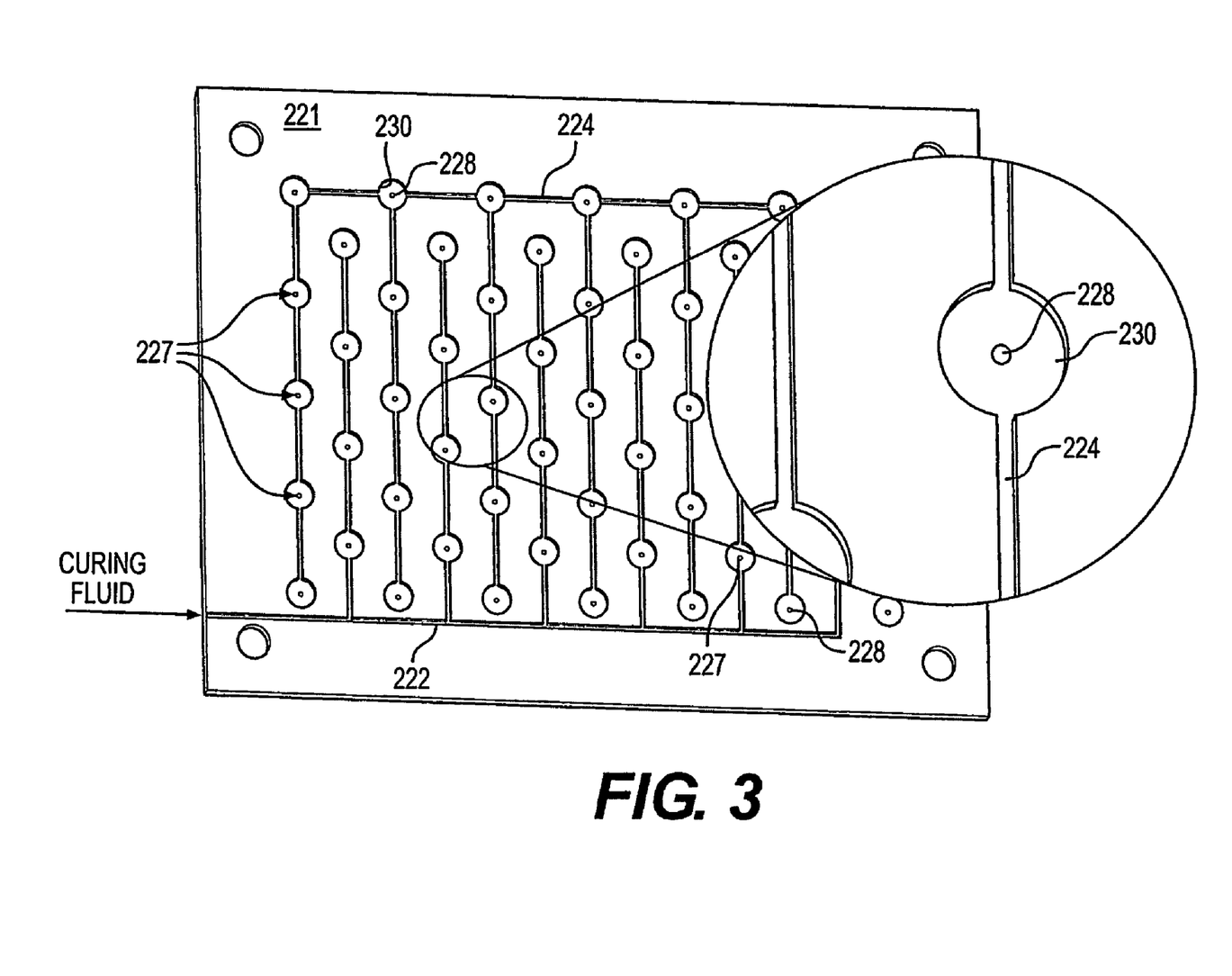
FIG. 3 is a perspective view of an alternative network plate embodiment, suitable for use in the system illustrated in FIG. 1.

FIG. 3 is a perspective view of an alternative embodiment of a network plate 220. The alternative embodiment network plate 220 can have a structure that is similar to the network plate 120 illustrated in FIGS. 2A and 2B. The network plate 220 may include a first set of fluid delivery channels 222 formed in a plate 221, and a second set of channels 224 in the plate 221. The fluid delivery channels 222 are used to deliver curing fluid from the curing fluid source 30 (FIG. 1) to the mold cavity (not shown), via injection gates 227. The second set of channels 224 are used to vent gas from the mold cavity during molding operations. Vent gases are conveyed from the mold cavity, through vent gates 228, and out of the mold structure 100 via the channels 224.

As shown from the magnified view of the portion of the network plate 220, the network plate 220 also includes bypass pathways 230 formed in the plate 221. The bypass pathways 230 are integrally formed with the channels 222, 224, and extend around the gates 227, 228. The bypass pathways 230 allow curing fluid to bypass the gates 227, 228 when the gates are selectively blocked by the gate control system 150. Therefore, blocking an individual gate 227 or 228 does not result in blocking an entire section of one of the channels 222, 224, and the gates 227, 228 can be selectively opened or closed at any time without affecting the open/closed, or "on/off" status of downstream gates.

Figure 4:
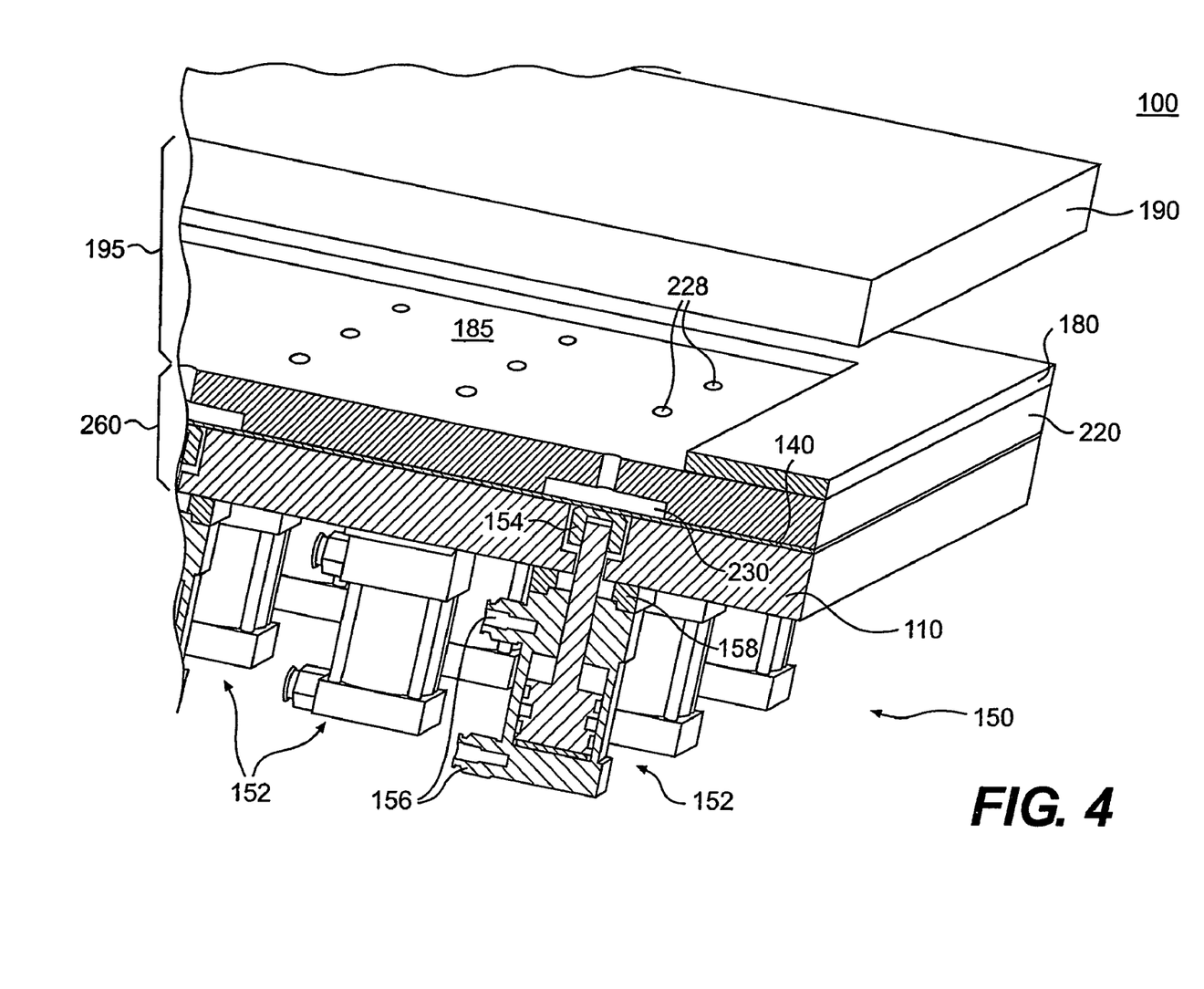
FIG. 4 is a partially exploded of a portion of a mold structure.

FIG. 4 is a partially exploded sectional view of a portion of the mold structure 100. The mold structure 100 shown in FIG. 4 includes the alternative embodiment of the network plate 220. A mold platen 260 includes the network plate 220, the deformable member 140, and the backer plate 110. In FIG. 4, the lid 190 is removed from the mold apparatus 100 to illustrate the mold cavity 185, and a molding surface 232 of the network plate 220. As shown in FIG. 4, the gate control system 150 comprises a plurality of pistons 152. The pistons 152 are mounted in the backer plate 110. Each piston 152 includes a plunger 154, and each plunger 154 is positioned opposite either an injection gate 127 or a vent gate 128. The plungers 154 are each extendible and retractable between a closed and an open position, wherein the closed position is achieved by extending the plunger 154 until it forces a portion of the deformable member 140 into a corresponding gate 127 or 128, thereby closing the gate.

The pistons 152 of the gate control system 150 can be actuated by, for example, pressurized gas delivered by the pressure lines 36. Two pressure lines 36 (shown in FIG. 1) can be connected to either side of the piston 152 at fittings 156. The closing and opening operation is illustrated in detail in FIGS. 5A and 5B.

Figure 5A:
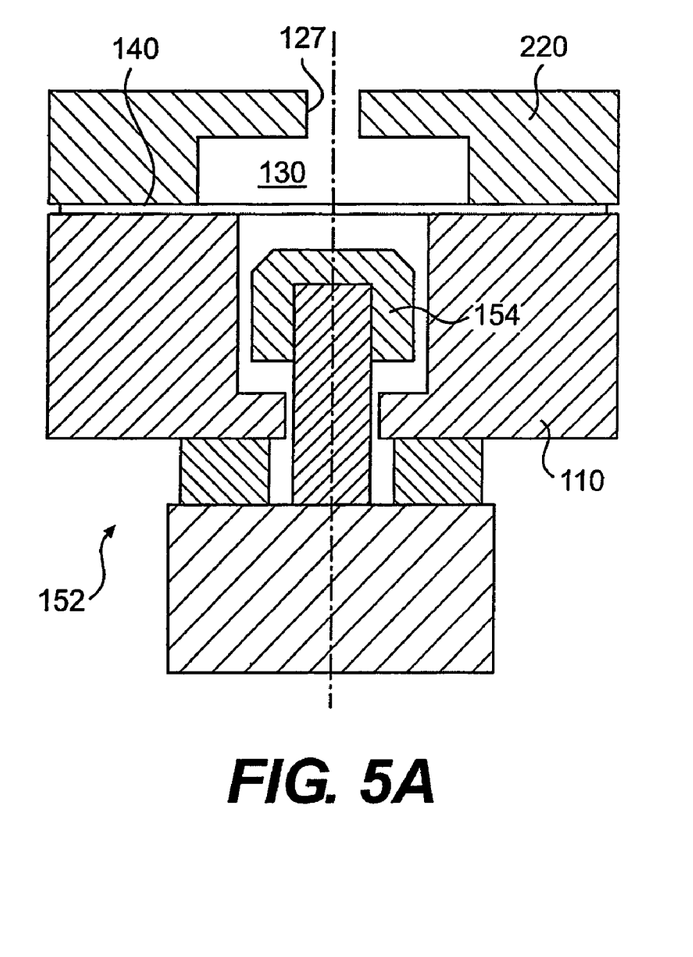
FIG. 5A is a sectional view of a portion of the mold structure illustrated in FIG. 4, illustrating an injection gate in an open position.
Figure 5B:
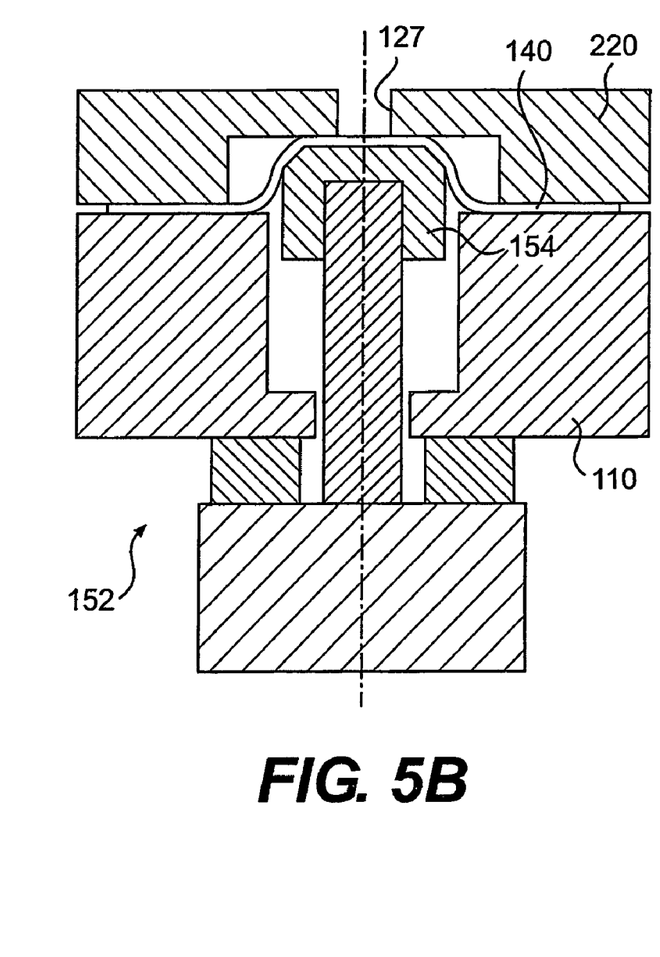
FIG. 5B is a sectional view of a portion of the mold structure illustrated in FIG. 4, illustrating an injection gate in a closed position.

FIG. 5A is a sectional view of a portion of the mold structure 100, illustrating an injection gate 127 in an open position. FIG. 5B is a sectional view of the injection gate 127 in a closed position. As shown in FIG. 5A, the plunger 154 has not deformed the deformable member 140 while the injection gate 127 is in an open position. Referring to FIG. 5B, when the injection gate 127 is to be closed, the plunger 154 is extended until it forces a portion of the deformable member 140 into contact with the gate 127, thereby closing the gate 127.

According to the above embodiments, each of the injection gates and vent gates in the network plates 120 or 220 can be individually and selectively opened and closed.

A molding process of the system 1000 will now be discussed. The molding process may be automated, with instructions for operating the various components of the system 1000 programmed in the control device 10. The control device 10 may include, for example, stored instructions, and may also be programmed to execute instructions.

The molding process begins with the curing fluid source 20 providing curing fluid to the mold structure 100 (see FIG. 1). The curing fluid source 20 may deliver curing fluid in response to, for example, a signal from the control 10. Referring to FIG. 3, the curing fluid enters the fluid delivery channels 222, and travels throughout the fluid delivery channels 222.

Referring to FIGS. 4, 5A and 5B, while curing fluid is provided to the fluid delivery channels, selective injection gates 227 and vent gates 228 may be closed and opened. The particular combination of injection gates 227 and vent gates 228 that are closed or left open, and the timing of the opening and closing, will depend upon the shape of the mold cavity 185 (FIG. 4), the type of curing fluid used, the resistance to flow in the mold platen 260, and other factors known to those of skill in the art. A particular vent gate 228 may be closed, for example, when curing fluid has filled the mold cavity 185 in the vicinity of that vent gate 228. Closing that vent gate 228 will prevent curing fluid from escaping the mold cavity through the vent gate 228.

Once the mold cavity 185 has been filled, the control 10 ceases the supply of curing fluid from the curing fluid source 20. The vent gates 228 may then be placed in a closed state. The curing fluid in the mold cavity 185 is then cured at preferred temperatures and for a preferred time according to the type of curing fluid employed, the size and shape of the mold cavity 185, and other factors.

After curing, the lid 190 and the frame 180 (FIG. 4) may be removed. The resulting mold product may then be removed. The network plate 220 may also be removed from contact with the deformable member 140. Any resin on the network plate 220 can be easily removed. In addition, resin may be easily removed from the deformable member 140. Advantageously, the pistons 154 in the gate control system 150, as well as the backer plate 110, are not contacted by the curing resin.

According to the above embodiment, the deformable member 140 prevents curing fluid from contacting the gate control system 150, and the backer plate 110. In addition, the components of the system 1000 may be easily cleaned of cured resin after a molding process. The deformable member 140 also provides a reliable seal with the gates 127, 128, 227, 228, ensuring that curing fluid does not escape when a gate is closed.

This mold system 1000 can be used, for example, in applications requiring a curing fluid to be delivered to various locations in which each gate may be independently controlled. A particularly advantageous use of the mold system is in the field of composite manufacturing processes, wherein a need exists for flow control for RTM and/or VARTM processes having many injection gates and vents distributed over the tooling surface.

The system 1000 provides a multitude of potential injection gate and vent locations that can be used to render a mold highly versatile. Advantageously, an operator can investigate different flow control strategies requiring different injection locations, without replacing tubing, etc.

The deformable member 140 may be, for example, a deformable membrane. The membrane may comprise, for example, a sheet of silicon-based material. Such material is desirable in that it is sufficiently durable, and retains its elasticity after repeated mold operations. Other deformable materials may also be used. For example, a sheet of ductile metal may be used as a deformable member.

The platens 160, 260 illustrated above include a single sheet deformable member 140. In an alternative embodiment, a plurality of deformable members may be used. For example, a deformable member could be attached to a network plate over each piston in the gate control system.

The gate control system 150 is shown as actuated by pressure-activated pistons. Other types of elements may be used in the gate control system 150. For example, the pistons 152 can be electromagnetic. Other means for exerting a force against the deformable member 140 can also be used to engage the deformable member with the gates.

In the above embodiments, the curing fluid can be a material such as, for example, a thermoset resin. Other materials may be used.

The foregoing description of the invention illustrates and describes the present invention. Additionally, the disclosure shows and describes only selected preferred embodiments of the invention, but it is to be understood that the invention is capable of use in various other combinations, modifications, and environments and is capable of changes or modifications within the scope of the inventive concept as expressed herein, commensurate with the above teachings, and/or within the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments, not explicitly defined in the detailed description.

INDUSTRIAL APPLICABILITY

As explained above, the molding systems and processes discussed above may be used to form molds at reduced costs and time.

What is claimed is:

1. A mold system comprising:
   a source of curing fluid;
   a mold cavity enclosure enclosing at least a part of a mold cavity;
   a mold platen comprising a network plate,
   a plurality of injection gates in fluid communication with the mold cavity, and
   at least one deformable member disposed adjacent to the network plate; and
   a gate control system comprising a plurality of pistons, each piston adjacent to one of the plurality of injection gates and adapted to deform at least a portion of at least one deformable member to selectively close the injection gate.

2. The mold system of claim 1, wherein the network plate comprises a plurality of vent gates.

3. The mold system of claim 2, wherein:
   the injection gates are connected to a first set of channels;
   the vent gates are connected to a second set of channels; and
   the first set of channels is in fluid communication with the source of curing fluid.

4. The mold system of claim 1, wherein the mold platen comprises a backer plate abutting the deformable member, wherein the pistons are mounted on the backer plate.

5. The mold system of claim 1, further comprising an actuating system for actuating the plurality of pistons.

6. A mold platen comprising:
   a network plate comprising one or more injection gates and one or more vent gates;
   a backer plate disposed parallel to and spaced from the network plate;
   at least one deformable member located between the network plate and the backer plate, the deformable member disposed between at least one of the injection gates and the backer plate and deformable to engage the at least one injection gate; and
   a gate control system comprising a plurality of pistons, each piston positioned to deform at least a portion of the at least one deformable member adjacent to one of the injection gates to selectively close the injection gates.

7. The mold platen of claim 6, wherein the injection gates are connected to a first set of channels, and the vent gates are connected to a second set of channels.

8. The mold platen of claim 7, wherein the first and second sets of channels are interdigitated.

9. A mold platen comprising:
   a network plate comprising one or more injection gates and one or more vent gates;
   a backer plate disposed parallel to and spaced from the network plate;
   at least one deformable member located between the network plate and the backer plate, the deformable member disposed between the one or more vent gates and the backer plate and deformable to engage at least one of the one or more vent gates; and
   a gate control system adapted to selectively deform at least a portion of the at least one deformable member to selectively close the at least one vent gate.

10. A method of molding, comprising the steps of:
    providing the molding system of claim 1;
    providing a molding fluid to the injection gates such that the molding fluid travels between the network plate and the deformable member; and
    selectively opening and/or closing one or more of the injection gates in the mold platen by disengaging and/or engaging the injection gates with the at least one deformable member.

11. The method of claim 10, wherein the network plate of the molding system further comprises a plurality of vent gates, the method further comprising the step of:
    selectively opening and/or closing one or more of the vent gates in the mold platen by disengaging and/or engaging the vent gates with the at least one deformable member to allow gas to escape the mold cavity enclosure through selected open vent gates.

12. The method of claim 10, wherein disengaging and/or engaging the injection gates with the at least one deformable member comprises selectively disengaging or engaging the at least one deformable member with corresponding pistons adjacent to the injection gates.

13. The method of claim 10, further comprising the step of:
    curing the molding fluid in the mold cavity enclosure.

14. A mold platen comprising:
    a network plate comprising:
        one or more injection gates and one or more vent gates;
        a backer plate disposed parallel to and spaced from the network plate;

at least one deformable member located between the network plate and the backer plate and deformable to engage at least one of the one or more vent gates; and a gate control system comprising a plurality of movable elements, each moveable element adjacent to a corresponding one of the injection gates or the vent gates and adapted to selectively exert a force against the deformable member sufficient to deform at least a portion of the deformable member into engagement with the corresponding gate to close the corresponding gate.

15. The mold platen of claim 14, wherein the plurality of movable elements comprises a plurality of extendible plungers.

* * * * *

UNITED STATES PATENT AND TRADEMARK OFFICE
CERTIFICATE OF CORRECTION

PATENT NO.        : 7,517,481 B2
APPLICATION NO.   : 10/544503
DATED             : April 14, 2009
INVENTOR(S)       : Suresh G. Advani et al.

It is certified that error appears in the above-identified patent and that said Letters Patent is hereby corrected as shown below:

On the Title Page, Item [75], Inventors, Matthieu Devillard, Newark, DE (US); should read --Matthieu Devillard, Ponpise, France (FR)--

Claim 1, Col. 5, Line 50, reads "a mold platen comprising a network plate,"; it should read --a mold platen comprising a network plate, comprising:--

Signed and Sealed this

Thirtieth Day of June, 2009

JOHN DOLL
*Acting Director of the United States Patent and Trademark Office*